Aug. 22, 1967   T. D. BARKER ET AL   3,336,859
FOOD PREPARATION

Filed July 28, 1966   4 Sheets-Sheet 2

INVENTORS
Thomas Dix Barker
Ethel Cox Barker
BY Lawrence J Field

ATTORNEY

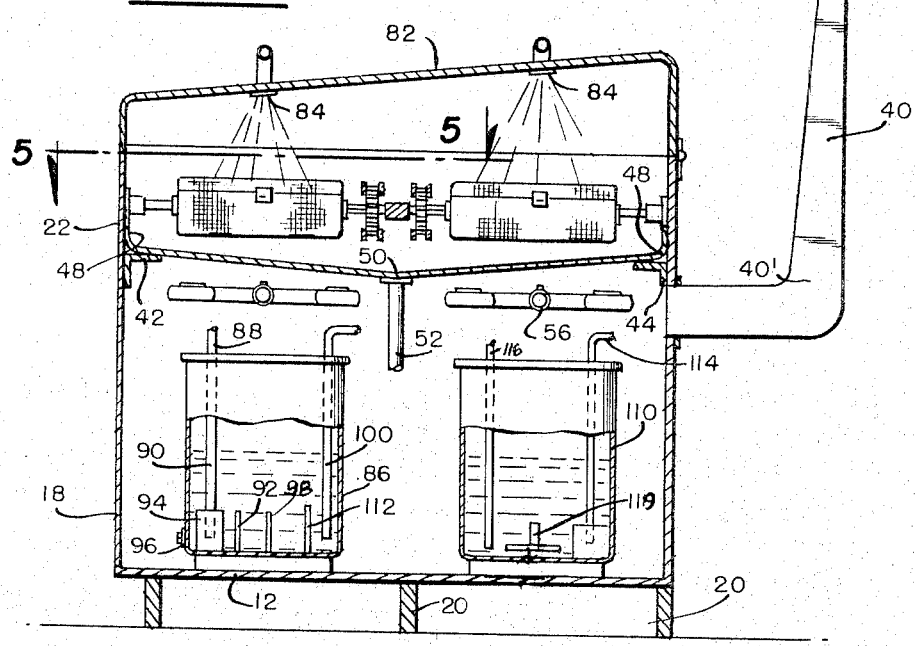
FIG. 4.
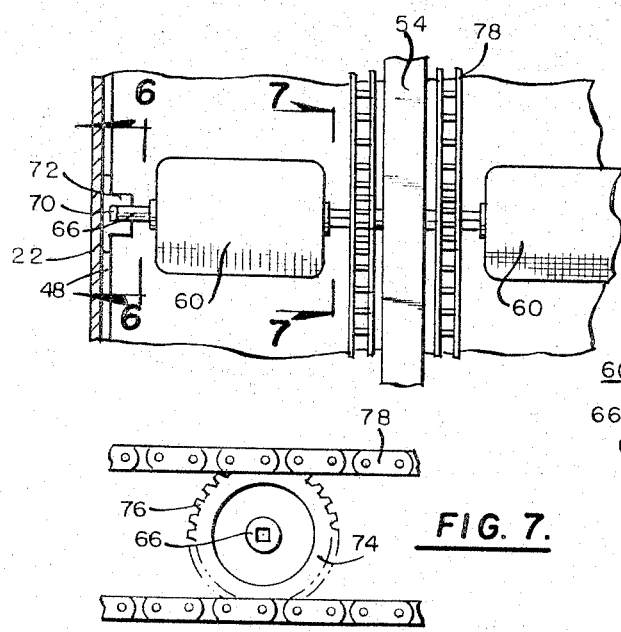
FIG. 5.
FIG. 7.
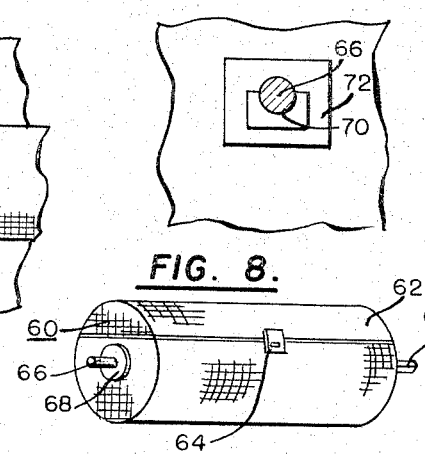
FIG. 6.
FIG. 8.
INVENTORS
Thomas Dix Barker
Ethel Cox Barker
BY *Lawrence I. Field*
ATTORNEY Aug. 22, 1967     T. D. BARKER ET AL     3,336,859
FOOD PREPARATION
Filed July 28, 1966     4 Sheets-Sheet 4

INVENTORS
Thomas Dix Barker
Ethel Cox Barker

BY *Lawrence I. Field*

ATTORNEY

3,336,859
FOOD PREPARATION

Thomas Dix Barker and Ethel Cox Barker, Banning, Calif. (both of 123 Hamilton Ave., Silver Spring, Md. 20901)
Filed July 28, 1966, Ser. No. 568,484
3 Claims. (Cl. 99—409)

This is a continuation-in-part of our United States patent application Ser. No. 466,615 filed June 24, 1965, and discloses improvements in the method and apparatus for preparing foods, described therein.

For purposes of illustration, the invention will be described as it relates to the preparation of pan fried whole chicken, but it is to be understood that the preparation of pan fried rabbit, quail or other fowl is substantially identical with the preparation of the chicken, except for variations in seasoning or cooking time and that the same apparatus is utilized in the same manner for automatically preparing food other than chicken, whether in the form of whole fowl or animal or as pieces thereof.

Deep frying of chicken parts is not new and a variety of procedures directed generally to producing an attractive evenly browned piece of chicken are known. Unless special precautions are taken the deep fried chicken is often dry to the taste and/or greasy to the touch and hence is less than ideal for many individuals' personal tastes. At best deep fried chicken has a staying quality of thirty minutes and then it has lost its succulence and become dried food, edible and inexpensive but without much more in the way of claims.

In the same manner pan fried chicken, at least in cooked parts, is not new, and most American families enjoy this on a regular basis. However, prior to the instant invention, the following results were common:

(a) Usual cooking time was thirty minutes as witnessed by the first thing a person is told at a restaurant if he orders pan fried chicken. "There will be a thirty-minute delay." This was not unreasonable because pan fried chicken could not be held. Even with this period of cooking, it was almost impossible to find pan fried chicken done to the bone without the usual and untempting blood veins appearing next to the bone;

(b) It was impossible to serve pan fried chicken at banquets, due to the time necessary to cook same and the fact that it would not hold. This is not entirely true because it could have been done if one built a tremendous kitchen and hired numerous special cooks for the one meal. Again the fact that it was not done is evidence of the practical impossibility.

(c) If pan fried chicken were prepared for a group and certain people did not attend as planned, the food was entirely lost, again for the lack of holding qualities;

(d) For the same reason, pan fried chicken, although by Government study the favorite American dish, is not used for commercial airline service;

(e) The flavor of the particular pan fried chicken depended upon the relative abilities of the cooks; and (f) The grease necessary to pan fry chicken had to be changed every day or so.

(g) Pan fried chicken could not be cooked and then refrigerated and/or frozen and thereafter reheated with absolutely no loss in the juicy succulence, the golden brown color, and the flavor. In fact, almost anyone could distinguish between fresh hot pan fried chicken and reheated pan fried chicken.

The present invention provides a technique and apparatus whereby juicy, succulent, evenly browned and virtually greaseless pan fried whole chickens are made available in a completely automatic manner in 12 to 15 minutes from start to finish. The grease need never be changed in the instant invention although additional grease must be added from time to time. This is a great cost savings to the restaurateur.

The chicken that is produced by this method may be kept refrigerated for thirty days and then reheated to produce a product undistinguishable from fresh hot pan fried chicken, as regards color, succulence, and flavor.

The product is cooked entirely through and through with no unsightly and unappetizing blood veins showing close to the bone.

Briefly the process comprises the following sequence of steps, each of which will be explained in detail:

(1) Washing and soaking;
(2) Seasoning and flouring;
(3) Inserting implements into the chicken;
(4) Cooking in oil; and
(5) Post cooking treatment with water.

The invention will be more readily understood from the drawings accompanying this application in which:

FIGURE 4 is a view partly in section taken along plane 4—4 of FIGURE 3;

FIGURE 5 is a fragmentary plan view of the apparatus viewed on plane 5—5 of FIGURE 4;

Figure 1:
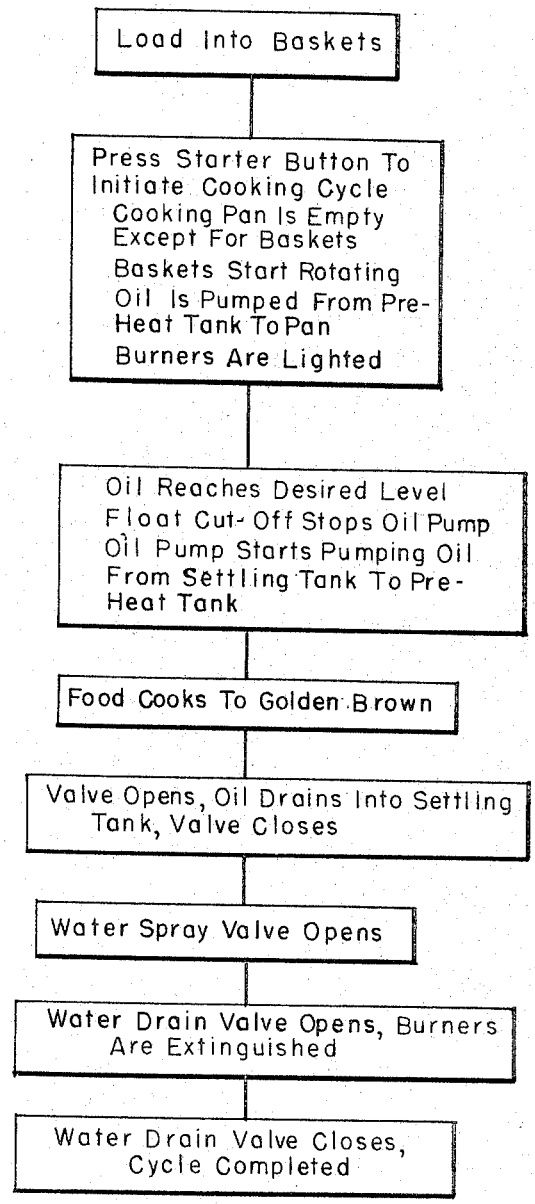
FIGURE 1 is a diagrammatic flow sheet of the process.
Figure 2:
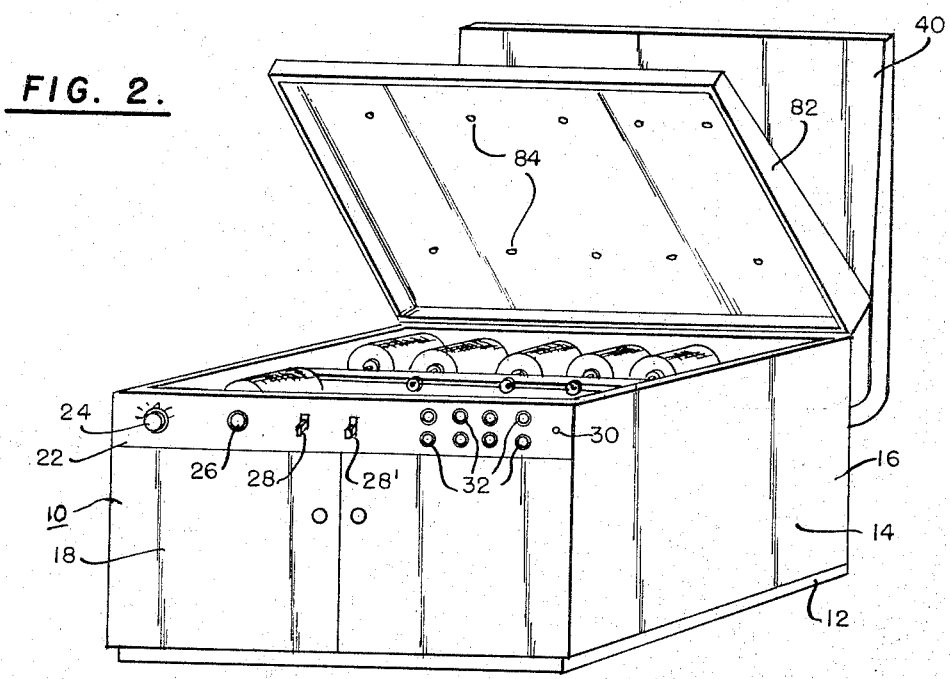
FIGURE 2 is a view of the apparatus as seen in perspective.
Figure 3:
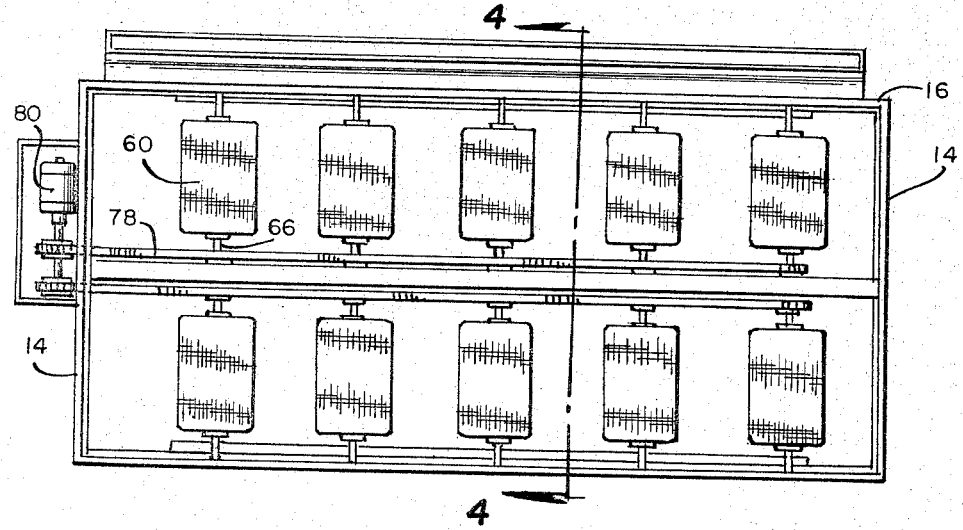
FIGURE 3 is a plan view of the apparatus of FIGURE 2 with the lid removed.
Figure 9:
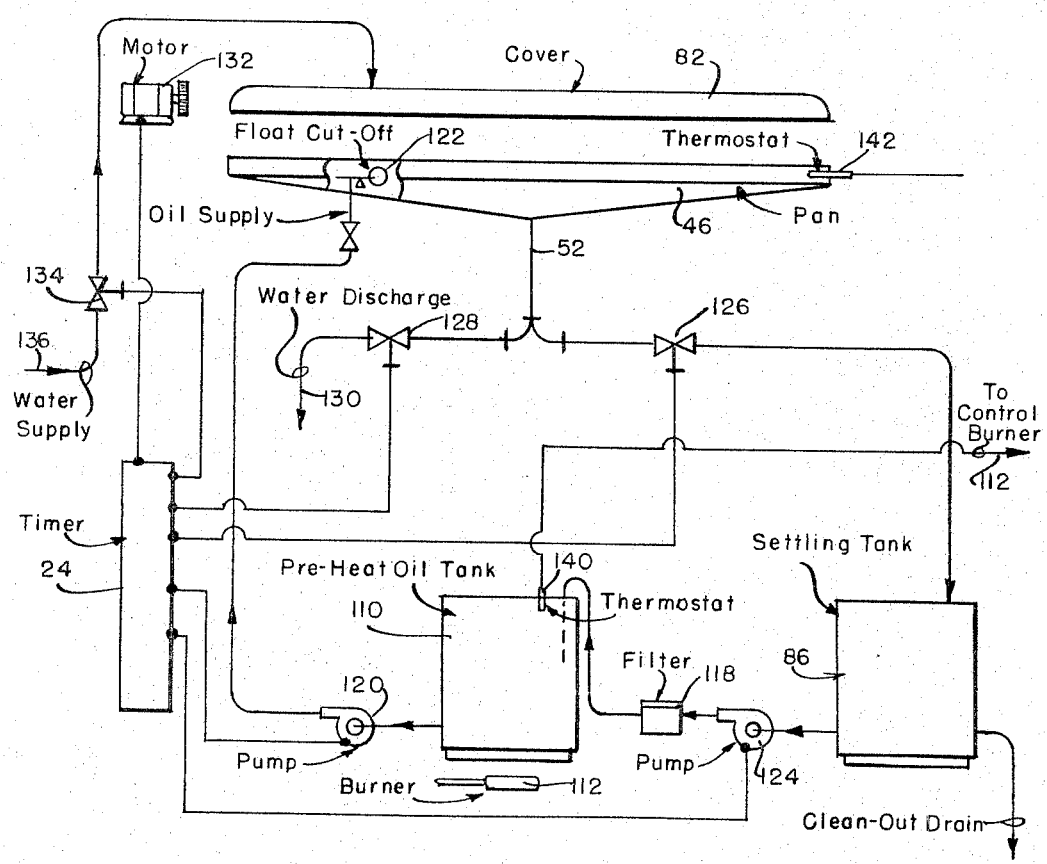
Figure 10:
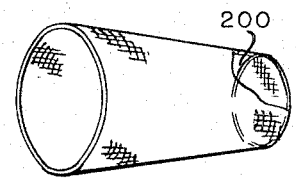

FIGURES 6 and 7 show details taken on planes 6—6 and 7—7 of FIGURE 5;

FIGURE 8 is a view of the frying basket;

FIGURE 9 is a schematic diagram of the timer controlled mechanism of the apparatus; and FIGURE 10 is an isometric view of an implement used in cooking the chicken.

As described in our earlier filed application, the first step in the preparation of the chicken, assuming that dressed poultry is available, consists in washing and soaking the chicken in clean tap water. Whether the chicken is whole, or cut up in pieces, this part of the washing is conducted so as to remove any foreign matter from the surfaces of the chicken. Thereafter, the whole chickens or pieces of chicken are placed in tubs or trays into which enough tap water is poured to cover the chicken. The tub or tray and its contents are placed in a cool place, e.g. refrigerated space maintained at between about 35° F. and 45° F. The blood and any chemicals used to preserve the chicken soak out into the water which becomes discolored. From time to time, e.g. every 8 hours, the water in the tray is discarded and is replaced with fresh tap water, until the tap water is no longer discolored after 8 hours soaking. Usually the washing and soaking portions of the process extend for a period of at least 24 hours, after which the cells of the chicken are thoroughly saturated with water and water has replaced the body fluids in the circulatory system of the chicken. As a consequence, the clean water distributed throughout the chicken materially assists in evenly cooking the chicken to a tender product.

The chicken is then seasoned and then rolled in flour. The particular blend of seasonings used may be varied without departing from the invention and will be varied in accordance with local preference. The seasoning is placed directly on the chicken and due to the amount of water the seasonings will be completely absorbed by the chicken at the time of application or during the cooking. The flour contributes to the retention of water in the chickens and to even cooking of the chicken.

In order to insure that the cooking oil has access to the interior as well as the exterior of the chicken or other food to be cooked, cylinders 200 of stainless steel mesh, such as that shown in FIGURE 10, are inserted into available openings in the food. For example, such tubes are inserted into the incisions normally made when the whole chicken is cleaned and dressed, e.g., the hole below the neck and the hole adjacent the tail of a whole chicken.

Then the chickens are loaded ino baskets, such as the one shown in FIGURE 8 and the baskets are loaded into the top of the apparatus, as hereinafter described, so that they can be rotated by mechanism therein.

The apparatus is started by pressing a starter button to initiate the cooking cycle. At this instant, the apparatus is empty except for the food baskets and their contents which have been loaded into the apparatus. Actuation of the starter button effects the following: (1) it starts the motor which drives the basket rotating sprocket chain, thereby causing the baskets to rotate, (2) it starts the pump which pumps oil from a preheat tank into the cooking pan, and (3) it causes the mechanism which lights the burners to do so.

When the incoming oil reaches the desired level in the cooking pan, i.e., on level approximately even with the spindles located on the axis about which the baskets rotate, a float actuated switch deenergizes the oil pump and closes the valve from the preheat tank so that no more oil will be pumped from the preheat tank on this cycle. At the same time, the float actuated switch energizes an oil pump provided from a settlement tank to pump oil from a settlement tank to the preheat tank, until the latter is filled to the desired extent.

The baskets continue to turn and the food which remains one-half immersed in the heated oil continues to cook. At the end of 12 to 15 minutes the food has a golden brown color and cooking has been completed. The timer has reached a point in its cycle at which it opens a valve to drain the oil from the cooking pan and into the settlement tank, preferably through a filter.

After the oil has drained from the cooking pan, the oil drain valve is automatically closed (by the timer) and the water inlet to the water sprays is opened. Water is sprayed onto the hot, browned cooked food for about 5 seconds, after which the water drain valve is automatically opened and the supply of fuel to the burners is terminated, causing the burners to shut down.

At the end of a preset interval, usually about 10 seconds, the water drain valve is closed and the cycle is completed. The lid is raised and the baskets containing the cooked food are unloaded from the apparatus.

All of the steps in the above sequence are caused to occur at preselected times during the cycle, by action of a timer or other suitable control means.

The apparatus with which the foregoing method is carried out is more fully shown in FIGURES 2 to 9 and is enclosed in a housing 10 consisting of a base 12, side wall panels 14, a back wall panel 16 and front doors 18 mounted for quick and easy removal to permit access to the equipment enclosed within housing 10. Doors 18 and panels 14 and 16 are connected and supported in any known manner permitting their removal to provide access to the equipment in housing 10. Beneath the base 12 is a supporting grid 20.

A panel board 22 is located on the front of the housing, above doors 18. As shown schematically in FIGURE 2, panel board 22 serves as the mounting for: a timer 24 which actuates or energizes each of the pumps, motors and valves in proper sequence and for suitable intervals during the cycle of operations; one or more thermostats or thermometers 26 to indicate the temperature of the cooking oil in the preheat tank and/or the temperature of the cooking oil in the cooking pan; and one or more manual switches 28, 28' for manually controlling the supply of water used to flush or rinse the equipment during cleaning of same, or for emptying the oil from the system when repairs are to be made, or for other noncycled operations. The panel 22 may also carry a starting button 30, and a bank of colored lights 32, each of which represents a single step in the operation of the machine. For instance, one light when lit could indicate that the preheat tank pump was running, another light could indicate that the water drain valve was open, etc.

Supported on the rear panel 16 of the housing is an angular shaped vent 40, one leg of which extends rearwardly along the length of the back wall 16 and the other leg of which extends upwardly and serves as a chimney flue tapering from a wider base to a narrow top. If desired, a damper may be present in the flue to control the draft therein. A second vent 40' may also be provided for the lower compartment.

Angle 42 secured to the rear of pan 22 and angle 44 secured to the front surface of rear wall 16, and similar angles (not shown) mounted along side wall panels 14, constitute a frame on which cooking pan 46 is supported. Pan 46 has upright side walls 48 which may be welded, brazed, riveted, or otherwise temporarily or permanently secured to the housing 10. Pan 46 slopes from all four side walls 48 downwardly toward a center drain 50 from which a drain pipe 52 extends vertically. Burners 56 are positioned under pan 46 to heat the same during cooking. Infrared gas burners may be used.

A bar 54 extends between sidewalls 14 at a suitable height above the center drain and serves as a support for the baskets 60, in which the food is cooked. The baskets 60 and pan 46 are preferably made of stainless steel. Baskets 60 consist of a wire cage which may be a rectangular box, or a cube, or a cylinder, or an octagon, or any other desired shape. A door 62 and door latch are provided to permit insertion of the food to be fried into baskets 60. A rod 66 extends from opposite ends of baskets 60, to which it is secured by mounting plates 68. The portions of rod 66 extending outwardly from mounting plates 68 are received in the slots 70 of open bearings 72 or other similar supports permitting shaft 66 to rotate. Any conventional means may be provided for rotating shaft 66, a preferred means being shown in FIGURE 7 consisting of a gear wheel 74 having teeth 76 adapted to be engaged by a sprocket 78 driven by a motor 80. For cooking chicken in 12 inch long baskets, 4 inches in diameter, one basket rotation every four minutes is quite satisfactory and is readily obtained by suitable gearing. Other size baskets may be used if the food loads to be fried are larger or smaller.

The apparatus is provided with a cover 82 which is suitably insulated to minimize heat loss and which is connected to a supply of clean, potable water which it discharges through a plurality of ports 84 located in its underside. Ports 84 are arranged in cover 82 so that there is one port directly above each of the baskets 60 when the hood is closed.

Also enclosed within the enclosure 10 are two tanks, each made of stainless steel. Tank 86 is a stainless steel tank with a removable cover and is connected by suitable piping (shown schematically in FIGURE 9) to pan 46 from which it is to receive the hot oil at the end of the cooking step of the cycle.

An inlet 88 admits oil into the settlement tank from pan 46 and drain pipe 52. A pipe 90 extends downwardly from inlet 88 and terminates about 6 inches above the floor of tank 86. A stainless steel wire mesh cylinder 94 surrounds the outlet of pipe 90 and localizes discharge into tank 86. A baffle 92 causes the oil discharged by pipe 90 to flow along the wall of tank 86 so as to minimize disturbance of any solids settling in tank 86. A clean out plug 96 is provided adjacent this portion of tank 86. A baffle 98, of any suitable configuration, minimizes oil flow in the lower portion of tank 86. Outlet pipe 100 serves as a means to discharge oil from settlement tank 86 to preheat tank 110 at the proper time in the cooking cycle. A baffle 112 and wire mesh screen frame around the intake opening of pipe 100 protect the pipe from taking in foreign matter.

Disposed beneath preheat tank 110 is a burner. An inlet 114 admits oil from the settlement tank 86 into the preheat tank and a pipe 116 serves as the outlet for oil pumped from the preheat tank to the frying pan 46. A baffle plate 119 is supported on the bottom of tank 110.

The preheat tank is proportioned to have a capacity equal to that needed in the frying pan.

The covers on each of tanks 86 and 110 and the oil piping are constructed and arranged so that the covers can be removed without disconnecting any piping.

A filter 118 is interposed between settlement tank outlet pipe 100 and preheat tank inlet 114 so that the oil leaving the preheat tank has been filtered.

As best seen in FIGURE 9, the timer 24 controls the following equipments:

(1) Pump 120 which pumps oil from preheat tank into cooking pan 46 and which cuts off by a float valve 122 in pan 46;

(2) Pump 124 which pumps oil from settlement tank 86 to preheat tank 110;

(3) Oil drain valve 126 which connects drain 52 with settlement tank 86;

(4) Water drain valve 128 which drains water from pan 46 at the end of the cycle and which discharges to waste through line 130; and (5) Water pump 132 and water supply valve 134 through which water supplied through inlet 136 is caused to flow to the ports 84 in cover 82 so as to spray water on the cooked food.

A thermostat 140 is provided to monitor the temperature of the oil in preheat tank 110 and may be used to control the adjustment of burner 112.

A thermostat 142 is provided in pan 46 to monitor the temperature of the frying pan oil.

In summary, the frying pan is empty of oil. There is X number of gallons of oil in preheat tank at 300° F. There is also 1½ times the amount of oil in settlement tank as there is in the preheat tank. This gives a ratio of 2½ times the amount of oil needed for the frying pan.

Load food baskets (holders) and place them in frying pan; close lid; press starter button; burners go on; oil starts to flow into pan from preheat tank (by oil pump); chicken holders have started to move very slowly (speed can be set for any given ratio). By the time the oil has reached proper level in pan, its temperature has reached 350–360° F. which is present frying temperature.

Oil pump that brings oil from settlement tank goes on and refills the preheat tank for the next frying. By this time the food is in the frying cycle which at present is 12 to 15 minutes; all almost simultaneously and all automatically.

When the allotted frying time has passed the timer opens oil drain valve, oil drains quickly, oil drain valves close, water valves open as water spray jets spray water on food to wash off residue and fat. When this has drained, water valve closes (both automatic drain valves are then closed), the frying pan is dry, heat turns off, burners are now off, the preheat tank has a new charge of oil ready for use.

The fried food is removed from pan and it is ready for another load of food and ready to start a new cycle, all in a very short time. Thereafter the cylinders 200 are removed from the completed product.

The invention is of particular utility in the pan frying of whole, properly dressed chicken, which requires only 12 to 15 minutes processing from the time the chicken is loaded into the apparatus to the time it is unloaded and is ready to serve.

It will be appreciated that the present invention is particularly suited for large banquets because of the ease in handling and preparing for serving and also because of the unusual keeping qualities of the cooked product when it is stored either by freezing or refrigeration and kept for long periods of time. It has been tested for a period of thirty days. It has been found that whole fowl which have been cooked in the manner described can be stored without losing any of their delicate flavor or natural juices, although this is not equally true for fowl which have been cut in pieces before cooked.

When reheated, after storage, the cooked food regains its tender, juicy, and golden brown condition just as it was when it was first fried, and this makes it possible to serve large numbers of people with a minimum of effort and time and a maximum of economy.

Not only has it been found that the cooked whole chicken does not deteriorate in quality when subjected to freezing or refrigeration for long periods (i.e. there is no noticeable change in its color, flavor, tenderness or juiciness when reheated for serving), but it has also been found that the cooked whole chickens exhibited no tendency towards spoiling or deteriorating even when held 24 hours without refrigeration, at ambient temperatures.

As an additional advantage the cooking oil need not be replaced as it is never broken down.

Having now described the invention it is not intended that it be limited except as required by the appended claims.

We claim:

1. An apparatus for pan frying fowl or game which comprises:
   a shallow pan adapted to contain a cooking oil;
   means to heat said pan;
   means to support fowl or game in said pan and to permit said food to be one-half immersed in the cooking oil contained in said pan;
   means to admit oil to said pan;
   means to discharge oil from said pan; and
   means to spray a fine spray of water onto the food in said pan immediately after the oil has been discharged from said pan and while said food retains the heat imparted to it during its pan frying in said pan.

2. The apparatus of claim 1 including means to admit and discharge liquids to and from said pan in a desired timed sequence.

3. The apparatus of claim 1 including two tanks, a first tank adapted to supply heated cooking oil to said pan and a second tank adapted to receive cooking oil from said pan, conduit means connecting each of said tanks to said pan, pump means operatively associated with said conduit means and means connecting said two tanks to one another to permit said second tank to discharge into said first tank.

References Cited

UNITED STATES PATENTS

| 1,106,926 | 8/1914 | Copland | 99—410 |
| 1,659,415 | 2/1928 | Thomas | 99—409 |
| 2,287,396 | 6/1942 | Roth | 99—410 XR |
| 2,614,485 | 10/1952 | Sinkwitz et al. | 99—409 XR |

WALTER A. SCHEEL, *Primary Examiner.*

ROBERT W. JENKINS, *Examiner.*